Sept. 1, 1970   H. HUHN ET AL   3,526,098
PREPARING SOLID POLYMERS IN AN AQUEOUS DISPERSION BY THAWING
Filed Aug. 11, 1967
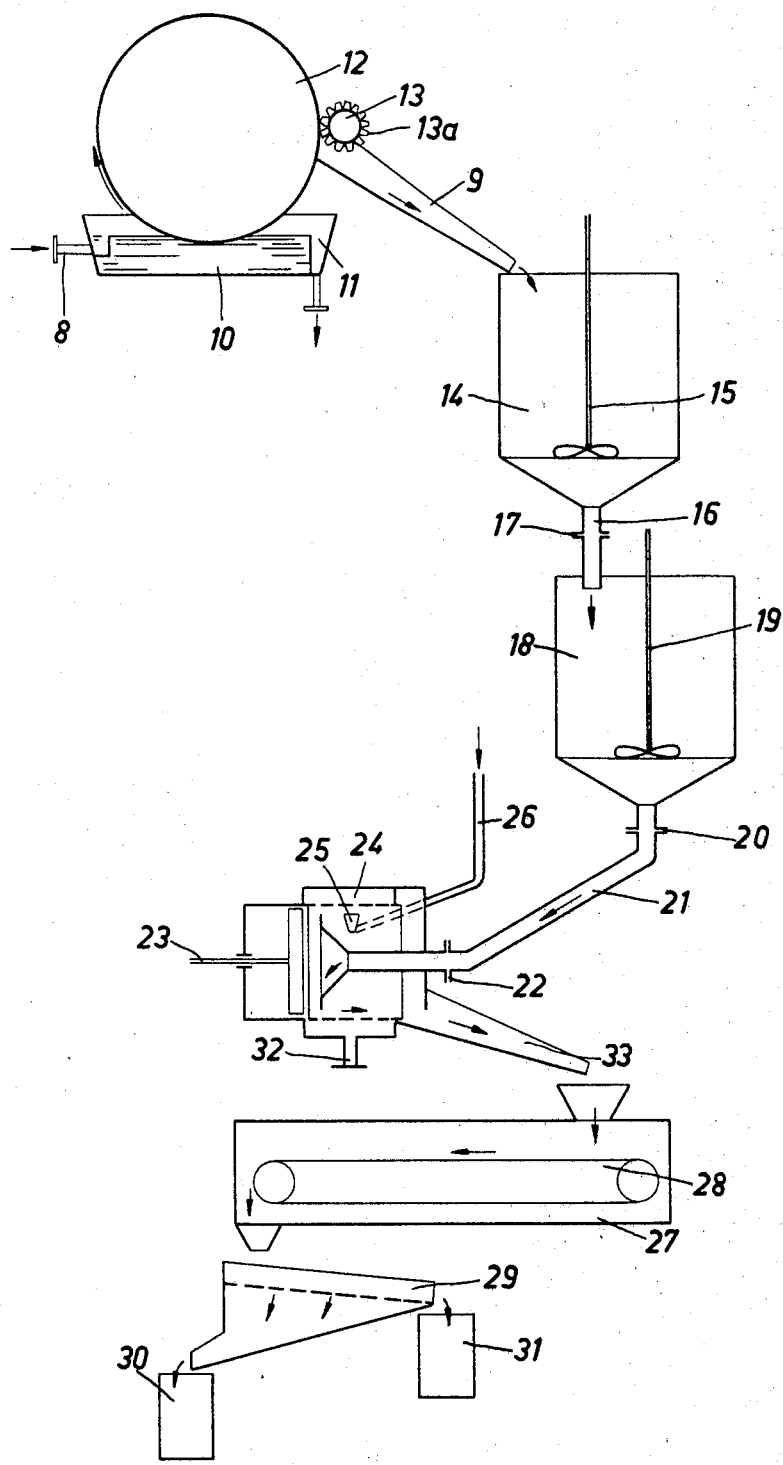
Inventors
HELMUT HUHN
GERHARD HOGREFE
JOACHIM STOLBERG
By McGlew and Toren
ATTORNEYS 3,526,098
PREPARING SOLID POLYMERS IN AN AQUEOUS DISPERSION BY THAWING
Helmut Huhn and Gerhard Hogrefe, Walsrode, and Joachim Stolberg, Bomlitz, Germany, assignors to Firma Wolff & Co. Aktiengesellschaft, Walsrode, Germany
Filed Aug. 11, 1967, Ser. No. 660,060
Claims priority, application Germany, Aug. 16, 1966, W 42,214
Int. Cl. B01d 9/04
U.S. Cl. 62—58                                   10 Claims

ABSTRACT OF THE DISCLOSURE

A process for the preparation of solid polymers from aqueous dispersions thereof, which comprises the steps of freezing the aqueous dispersion while being passed through a vessel, breaking up the frozen mass, introducing it into a hot liquid for thawing, whereby a suspension of the polymer in the molten liquid is obtained, separating the solid polymer particles from the liquid, washing, drying and finally screening the particles to obtain finer and coarser particles separately.

---

The invention also relates to an apparatus for carrying out the above process.

Aqueous dispersions of polymers and copolymers with other polymerizable compounds are known which are prepared by emulsion polymerization, on the basis of, for instance, vinylidene chloride, vinyl chloride, acrylic acid esters, vinyl acetate, vinyl propionate, styrene and others, and where the compounds to be copolymerized may, e.g., consist of acrylonitrile, methacrylonitrile, methacrylic ester, ethylacrylic ester, butylacrylic ester, isobutylacrylic ester, methacrylic acid methyl-, ethyl, butyl- or isobutyl esters, methylvinyl ketone, dichlorovinylidene fluoride, chlorobutadiene, butadiene, itaconic acid and its methyl, diethyl and dibutyl esters, vinylpyridin and isoprene.

It is further known to obtain solid polymers from the aqueous dispersions of plastics by electrolyte coagulation or by spray-drying. These methods, however, lead to products which are more or less contaminated by residual amounts of electrolytes or emulsifiers.

It is the object of the present invention to provide a process which permits to eliminate the above mentioned drawback and to obtain pure polymers by simple and inexpensive operations.

Other objects and advantages of the present invention will become apparent from the following description.

Generally speaking, the process according to the present invention, which can be carried out continuously, comprises the steps of freezing the aqueous dispersion while it is passed through a vessel, thawing the frozen mass, after comminuting it, in hot water, or in a water-miscible liquid, sepaarting the solid particles of the polymer obtained, washing, drying and finally screening them.

For thawing the frozen mass, only liquids can be used, which will not act as a solvent on the polymer. The solvents used are more particularly water, alcohols, glycols, polyglycols, either alone or in mixture with each other; for instance, pure water may be used, or a mixture of water and glycerol. The temperature of the liquid should be so adjusted that it will lie below the range of the sinter temperature of the solid polymer. The temperature actually only determines the time it takes for the frozen particles to thaw.

The thawing operation is preferably carried out with stirring in order to achieve a better distribution of the particles in the warm liquid.

For freezing the aqueous dispersion of the plastic, any continuously working device for rapid ice production is applicable, e.g., freezing plants operated by rollers, worms, scale-ice production, tunnel-band-freezing and crushed ice freezing devices. Especially useful is the application of rotating cooling rollers, so-called scale ice producers. The parts of the devices which come in contact with the dispersion should, if possible, be made of corrosion-proof material.

It proved to be advantageous, when using rotating cooling rollers, to feed-in the aqueous dispersion over a trough which is arranged below the roller and is provided with inlet and overflow pipes. The speed at which the roller is rotating and the depth to which it is immersed in the trough can be adjusted in a desired manner. The temperature of cooling should be so adjusted that the dispersion will freeze almost instantly upon contact with the cooling surface.

It was also found that the mean grain size of the solid polymer particles is definitely dependent on the freezing temperature, in such a manner that with decreasing freezing temperature the maximum grain size is shifted in the direction of smaller grain particles. It is therefore possible to obtain, in accordance with the invention, the desired mean particle size upon thawing, by adjusting the freezing temperature. Since the temperatures are different with different starting materials, it is necessary to determine the required temperatures by making preliminary tests.

For instance, by using an aqueous vinylidene chloride copolymer dispersion, the following correlation of freezing temperature and mean grain size have been found (all percentages by weight):

(a) For a copolymer dispersion consisting of 86% of vinylidene chloride, 10% methylmethacrylate, 3% acrylonitrile and 1% acrylic acid—

| Freezing temperature, ° C.: | Mean grain size, mm. (about) |
|---|---|
| −40 | 0.04 |
| −30 | 0.06 |
| −20 | 0.10 |
| −15 | 0.14 |
| −10 | 0.18 |
| −7 | 0.22 |

Sintering temperature 75–80° C.

(b) Aqueous copolymer dispersion of 90% vinylidene and 10% methylmethacrylate—

| Freezing temperature, ° C.: | Mean grain size, mm. (about) |
|---|---|
| −20 | 0.06 |
| −15 | 0.10 |
| −10 | 0.15 |
| −7 | 0.20 |

Sintering temperature 80–90° C.

When the comminuted frozen dispersion mass was made to thaw in warm water or a water-miscible liquid, the solid particles were obtained in the sizes indicated above.

It was further found that it is possible, if desired, to achieve a coarsening of the primary fine particles by a short after-treatment of the suspension first obtained by heating it to the range of the sintering temperature. By the coarsening of the grain filtering is made easier and the separated resin material exhibits lower residual moisture.

The thawing operation is preferably carried out while stirring in order to obtain bette distribution of the particles in the warm liquid. The after-treatment of the suspension in the range of the sintering temperature should also be effected while stirring gently, in order to prevent lump formation of the resin particles.

The accompanying drawing shows schematically an embodiment of an apparatus for carrying out the process according to the present invention by way of example.

The apparatus comprises a trough 10, an admission pipe 8 for the copolymer dispersion, and an overflow pipe 11 for the purpose of maintaining the liquid in the trough 10 at a constant level. A steel roller 12 is arranged above the trough 10 so as to be immersed in the liquid for a certain depth. In the example described, the depth is 10 mm. The roller 12 is provided with internal cooling means and with means for rotation (both these means not shown).

Due to the cooling action of the roller, the liquid fed into trough 10 freezes and a sheet of ice several millimeters thick is formed on the surface of roller 12. To break up the ice and remove it from the roller surface, a scraper roller 13 is provided which is mounted for rotation in opposite direction from roller 12 (by means not shown). The scraper has helically arranged teeth 13a for more effective action which detach the ice in the form of scales of a few millimeters in size. For the removal of the scales a chute 9 is arranged obliquely leading from rollers 12 and 13 into a vessel 14, provided with a stirrer 15 and filled with warm water or one of the mixtures of solvents mentioned above. The temperature of about 60° C. is maintained in the vessel until all the icy scales have thawed.

After the scales have become completely liquid, they are passed into a second vessel 18 equipped with a stirrer 19 by way of a discharge pipe 16 with shut-off cock 17. The vessel 18 serves for short-time heating of the suspension to somewhat higher temperature, whereby the particles are coarsened.

In the next step of operations, the suspension has to be freed from the main portion of adhering water and washed to the desired degree of purity. For that purpose, a centrifuge 24 is provided, to which the suspension is conveyed over a discharge pipe 21 equipped with control cocks 20 and 22. Drive means for the centrifuge are indicated at 23. The main portion of water is drained by a pipe 32. In the centrifuge, washing of the suspended particles to a desired degree of purity is then effected by fresh washing water admitted through a line 26 and a spraying device 25. The washing water likewise leaves the centrifuge by pipe 32.

Further parts of the apparatus comprise a chute 33 leading from the centrifuge to a drying chamber 27 housing an endless belt 28; below the drying chamber a shaking screen 29 is arranged having the desired mesh size for delivering finer grains to a container 30 and the coarser grains to a container 31.

The operation of the device will be more fully explained in the following Example 1.

EXAMPLE 1

An aqueous copolymer dispersion consisting of 86% of vinylidene chloride, 10% methylmethacrylate, 3% acrylo nitrile and 1% acrylic acid is continuously fed to trough 10 through pipe 8. The steel roller is immersed into the liquid to a depth of 10 mm. and is rotated at a peripheral speed of about 1 m./min. The cooling in the interior is adjusted to —30° C. The icy mass forming on the surface is substantially frozen after a ¾ rotation of the roller. The scraper roller 13 breaks up the ice and removes the scales, which are several millimeters in size, over chute 9, delivering them to the water in vessel 24 which is maintained at 60° C. The mean particle size of the polymer in this case is about 0.06 mm.

The suspension formed after complete thawing is then passed on to vessel 18 which contains water of 75° C. The suspension remains there for a short time and the grain size of the particles is changed to 0.1–0.3 mm.

Subsequently, the suspension is passed to the centrifuge 24 where it is freed from the bulk of adhering water, washed with fresh water, and then conveyed to drying chamber 27 from where it leaves over a screening means 29 to be passed into container 30 for the finer grain size and container 31 for the coarser grains.

For comparison purposes, solid synthetic resins were made from the same aqueous dispersion by known processes, namely (a) By spray-drying;
(b) Electrolyte coagulation;

with the use of a 0.25% aqueous aluminum sulfate solution.

The granulate obtained according to Example 1 was washed with 4 times the amount of water as was the granulate obtained by the method (b); the granules were then dried.

The dry products obtained by all three methods under comparison were tested for emulsifier and ash contents. The following figures were found:

|  | Emulsifier content percent | Ash content, percent |
|---|---|---|
| (1) Resin obtained by spray-dying according to (a) | 1.9 | 0.08 |
| (2) Resin obtained according to (b) before washing | 0.2 | 0.2 |
| (3) Resin obtained according to (b) after washing | 0.1 | 0.2 |
| (4) Resins obtained according to the invention by freezing, before washing | 0.02 | 0.05 |
| (5) Resins obtained according to the invention, after washing | 0.005 | 0.05 |

These comparison tests show that the products made in accordance with the present invention contain considerably smaller residual amounts of emulsifier as compared to the products made by spray-drying and also considerably smaller amounts of ashes as compared to the products made by electrolyte coagulation.

EXAMPLE 2

The apparatus, copolymer dispersion, and the procedure used were the same as in Example 1; however, the surface temperature of the roller 12 was adjusted to —40° C.; in that case the grains obtained in vessel 14 had a mean size of 0.04 mm., which, when after-treated under the same conditions as described in Example 1, increased to a size of 0.06–0.2 mm.

EXAMPLE 3

The apparatus, copolymer dispersion and procedure used were the same as in Examples 1 and 2; only the liquid used for thawing the frozen particles in vessel 14, was a mixture of 90% water and 10% glycerol. The mean particle sizes obtained were the same as mentioned for Examples 1 and 2.

EXAMPLE 4

The apparatus and procedure used were the same as in Examples 1 and 2. The copolymer used consisted of 90% vinylidene chloride and 10% methylmethacrylate, having a sintering temperature of 80–90° C. When the roller temperature was adjusted to —20° C., the particles obtained after thawing had a mean grain size of 0.06 mm.

While a few preferred embodiments of carrying out the method of the invention are described in the examples, it should be understood that these are given by way of illustration and not of limitation and that many changes and modifications in the details can be made without departing from the spirit of the invention.

What is claimed is:

1. A process for the preparation of solid polymers from aqueous dispersions thereof which comprises the steps of freezing the aqueous dispersion while being passed through a vessel, breaking up the frozen mass, introducing it into a hot liquid for thawing whereby a suspension of the polymer in the molten liquid is obtained, separating the solid polymer particles from the liquid, washing, drying and finally screening the particles to obtain finer and coarser particles separately.

2. The process according to claim 1, wherein the aqueous dispersion is frozen while being passed through a vessel in continuous flow.

3. The process according to claim 2, wherein the hot liquid is water or a mixture of solvents which are inert with respect to the dispersed polymer.

4. The process according to claim 1, wherein the cooling temperature at which the freezing is taking place is selected in a manner to cause substantially immediate freezing.

5. The process according to claim 4, wherein the freezing temperatures are approximately between −40° C. and −70° C.

6. The process according to claim 5, wherein the freezing temperature is adjusted according to the desired grain size of the polymer resulting after thawing the frozen mass, whereby lower freezing temperatures cause the formation of smaller grains.

7. The process according to claim 1, wherein the thawing of the frozen mass is effected at a temperature below the sintering temperature of the polymers.

8. The process according to claim 7, wherein a short-time second heat-treatment of the suspension obtained upon thawing is carried out with gentle stirring at temperatures in the range of the sintering temperature of the polymer.

9. The process according to claim 1, which comprises subjecting to the treatment an aqueous copolymer dispersion of 90% by weight of vinylidene chloride and 10% by weight of methylmethacrylate.

10. The process according to claim 1, which comprises subjecting to the treatment an aqueous copolymer dispersion of 86% by weight of vinylidene chloride, 10% by weight of methylmethacrylate, 3% by weight of acrylonitrile and 1% by weight of acrylic acid.

References Cited

UNITED STATES PATENTS

| 2,131,333 | 9/1938 | Schweinitz | 62—58 |
| 2,651,665 | 9/1953 | Booker | 260—707 |
| 2,815,392 | 12/1957 | Brown | 260—707 |
| 2,773,849 | 12/1956 | Willis. | |
| 3,284,396 | 11/1966 | Talalay. | |

FOREIGN PATENTS 1,349,149  12/193  France.

NORMAN YUDKOFF, Primary Examiner

U.S. Cl. X.R.

23—308; 62—124; 260—29.7, 707